(12) United States Patent
Huang

(10) Patent No.: US 10,269,317 B2
(45) Date of Patent: Apr. 23, 2019

(54) GATE DRIVING APPARATUS AND ARRAY SUBSTRATE USING THE SAME

(71) Applicant: SHENZHEN CHINA STAR OPTOELECTRONICS TECHNOLOGY CO., LTD., Shenzhen, Guangdong (CN)

(72) Inventor: Xiaoyu Huang, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 184 days.

(21) Appl. No.: 14/906,683

(22) PCT Filed: Jan. 6, 2016

(86) PCT No.: PCT/CN2016/070287
§ 371 (c)(1),
(2) Date: Jan. 21, 2016

(87) PCT Pub. No.: WO2017/101177
PCT Pub. Date: Jun. 22, 2017

(65) Prior Publication Data
US 2017/0270880 A1    Sep. 21, 2017

(30) Foreign Application Priority Data
Dec. 15, 2015  (CN) .......................... 2015 1 0934336

(51) Int. Cl.
*G09G 3/36*  (2006.01)
*G02F 1/1343*  (2006.01)
*G02F 1/1368*  (2006.01)

(52) U.S. Cl.
CPC ......... *G09G 3/3677* (2013.01); *G02F 1/1368* (2013.01); *G02F 1/134309* (2013.01);
(Continued)

(58) Field of Classification Search
CPC .. G09G 3/3677; G09G 3/3696; G09G 3/3266; G09G 2300/0871; G09G 2310/08; G09G 2310/021; G09G 2310/0289
See application file for complete search history.

(56) References Cited

U.S. PATENT DOCUMENTS 9,875,706 B1 *  1/2018  Gong .................... G09G 3/36
2011/0158377 A1 *  6/2011  Hsu ..................... G09G 3/3677
                                                                377/79

(Continued)

FOREIGN PATENT DOCUMENTS

CN  1431632 A  7/2003
CN  101770750 A  7/2010
(Continued)

*Primary Examiner* — Kenneth Bukowski
(74) *Attorney, Agent, or Firm* — Ladas & Parry LLP

(57) ABSTRACT

A gate driving apparatus and an array substrate using the same are described. The gate driving apparatus comprises a driving circuit for outputting a first gate signal during a signal period wherein the signal period comprises an activated interval and an inactivated interval; a gate signal-processing module for receiving the first gate signal and processing the first gate signal to generate a second gate signal wherein the second gate signal comprises a first amplitude level during the inactivated interval; and a control unit activates the gate signal-processing module in the activated interval or inactivates the gate signal-processing module in the inactivated interval; wherein when the gate signal-processing module is in the activated interval, a first resistance value is formed to adjust the received first gate signal to generate the second gate signal having a second amplitude level, and the second amplitude level is less than the first amplitude level.

11 Claims, 4 Drawing Sheets

(52) U.S. Cl.
CPC ............... *G09G 2300/0408* (2013.01); *G09G 2310/0289* (2013.01); *G09G 2310/08* (2013.01)

(56) References Cited

U.S. PATENT DOCUMENTS

2014/0062568 A1   3/2014  Nishizawa
2014/0219412 A1*  8/2014  Chien .................... G11C 19/28
                                                            377/68

FOREIGN PATENT DOCUMENTS

| CN | 104200790 A | 12/2014 |
| CN | 104253959 A | 12/2014 |
| CN | 104284474 A | 1/2015 |

* cited by examiner

GATE DRIVING APPARATUS AND ARRAY SUBSTRATE USING THE SAME

BACKGROUND OF THE INVENTION

Field of Invention

The present invention relates to a technical field of a liquid crystal display (LCD), and more particularly to a gate driving apparatus and an array substrate using the same which are applicable to the LCD.

Description of Prior Art

Since the LCD is provided with the features of low radiation, small size and low power consumption for consumers, therefore, the conventional display unit with cathode ray tube is increasingly replaced by the LCD. An LCD panel is widely used in communication products including a notebook computer, a personal digital assistant (PDA), a flat panel television and mobile phone.

A thin film transistor (TFT) LCD is one of main flat panel display products, which has become a major display platform among the modern information technology products and video products. In order to satisfy the demands of narrower border width of display unit and lower costs, the technical filed of the gate on array is rapidly developed in recent years.

Practically, the change of the falling edge in the gate voltage output is too fast and sharp, e.g. the change from 33V (voltage) to −7V so that the basic standard voltage within the LCD panel is affected. Conventionally, the display panel utilizes an external printed circuit board (PCB), which is connected to the array substrate, to regulate the output voltage of the gates but the output voltage cannot be adjusted by the array substrate. Furthermore, the related circuits of the gate voltage output on the PCB is quite complicated. Consequently, there is a need to develop a novel gate driving apparatus to solve the problems of the conventional technique.

SUMMARY OF THE INVENTION

Therefore, one objective of the present invention is to provide a gate driving apparatus and an array substrate using the same by utilizing a gate signal-processing module so that the gate voltage is divided to at least two stages during the signal period, i.e. an activates interval and an inactivated interval and thus the voltage change of the amplitude level in unit time is reduced to advantageously maintain the basic standard voltage within the LCD panel to be constant.

Based on the above objective, the present invention sets forth a gate driving apparatus according to a first embodiment of the present invention. The gate driving apparatus which is disposed on an array substrate of a liquid crystal display (LCD) comprises a driving circuit, for outputting a first gate signal by way of an output terminal during a signal period wherein the signal period comprises an activated interval and an inactivated interval which is adjacent to the activated interval; a gate signal-processing module electrically coupled to the driving circuit, for receiving the first gate signal during the signal period and for processing the first gate signal to generate a second gate signal wherein the second gate signal comprises a first amplitude level during the inactivated interval; and a control unit electrically coupled to the gate signal-processing module, for generating a control signal wherein the control unit utilizes the control signal either to activate the gate signal-processing module in the activated interval or to inactivate the gate signal-processing module in the inactivated interval; wherein when the control unit utilizes the control signal to activate the gate signal-processing module in the activated interval, the gate signal-processing module forms a first resistance value and utilizes the first resistance value to adjust the received first gate signal in order to form the second gate signal which comprises a second amplitude level; and wherein the second amplitude level is less than the first amplitude level.

In one embodiment, the gate signal-processing module comprises a resistor having a second resistance value wherein the resistor receives the first gate signal; and a transistor having a source electrode, a gate electrode and a drain electrode, wherein the source electrode is electrically coupled to the resistor, the gate electrode electrically coupled to the control unit receives the control signal, the drain electrode is electrically coupled to a ground terminal, and a connection node between the resistor and the source electrode is used to output the second gate signal; wherein the control unit utilizes the control signal to control the transistor to be either an activated status or an in activated status, and when the transistor is in the activated status, the first resistance value is formed between the source electrode and the drain electrode of the transistor.

In one embodiment, the transistor a N-type metal-oxide-semiconductor field-effect transistor (MOSFET).

In one embodiment, the control signal is a periodical square wave signal.

In one embodiment, the second resistance value of the resistor is equal to an impedance between the output terminal of the driving circuit and the source electrode of the transistor.

In one embodiment, the second amplitude level of the second gate signal in the activated interval is positively related to the first resistance value.

In one embodiment, when the control unit activates the transistor in the activated status, the second gate signal is represented by the following formula:

$$S\_out = S\_in * (R1/(R1+R2));$$

wherein S_out is the second gate signal, S_in is the first gate signal, R1 is the first resistance value and R2 is the second resistance value.

In one embodiment, an amplitude level of the first gate signal is equal to the first amplitude level of the second gate signal during the inactivated interval.

An array substrate according to a second embodiment of the present invention comprises a gate driving apparatus disclosed in the above-mentioned descriptions.

In one embodiment of the array substrate, the gate signal-processing module comprises a resistor having a second resistance value wherein the resistor receives the first gate signal; and a transistor having a source electrode, a gate electrode and a drain electrode, wherein the source electrode is electrically coupled to the resistor, the gate electrode electrically coupled to the control unit receives the control signal, the drain electrode is electrically coupled to a ground terminal, and a connection node between the resistor and the source electrode is used to output the second gate signal; wherein the control unit utilizes the control signal to control the transistor to be either an activated status or an in activated status, and when the transistor is in the activated status, the first resistance value is formed between the source electrode and the drain electrode of the transistor.

In one embodiment of the array substrate, the transistor a N-type metal-oxide-semiconductor field-effect transistor (MOSFET).

In one embodiment of the array substrate, the control signal is a periodical square wave signal.

In one embodiment of the array substrate, the second resistance value of the resistor is equal to an impedance between the output terminal of the driving circuit and the source electrode of the transistor.

In one embodiment of the array substrate, the second amplitude level of the second gate signal in the activated interval is positively related to the first resistance value.

In one embodiment of the array substrate, when the control unit activates the transistor in the activated status, the second gate signal is represented by the following formula:

$$S\_out = S\_in * (R1/(R1+R2));$$

wherein S_out is the second gate signal, S_in is the first gate signal, R1 is the first resistance value and R2 is the second resistance value.

In one embodiment of the array substrate, an amplitude level of the first gate signal is equal to the first amplitude level of the second gate signal during the inactivated interval.

DETAILED DESCRIPTION OF THE PREFERRED EMBODIMENTS

Figure 1:
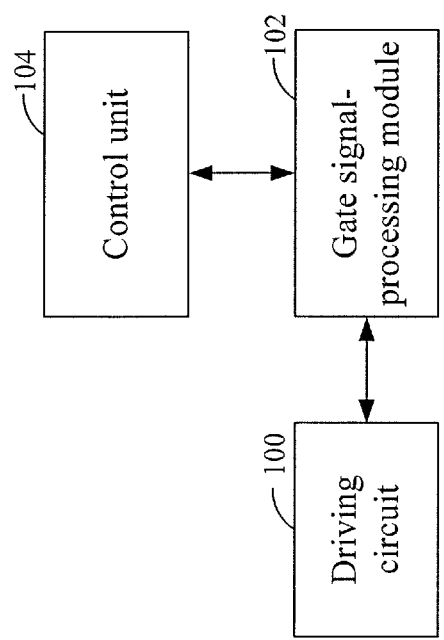
FIG. 1 is a schematic block diagram of a gate driving apparatus according to one embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Figure 2:
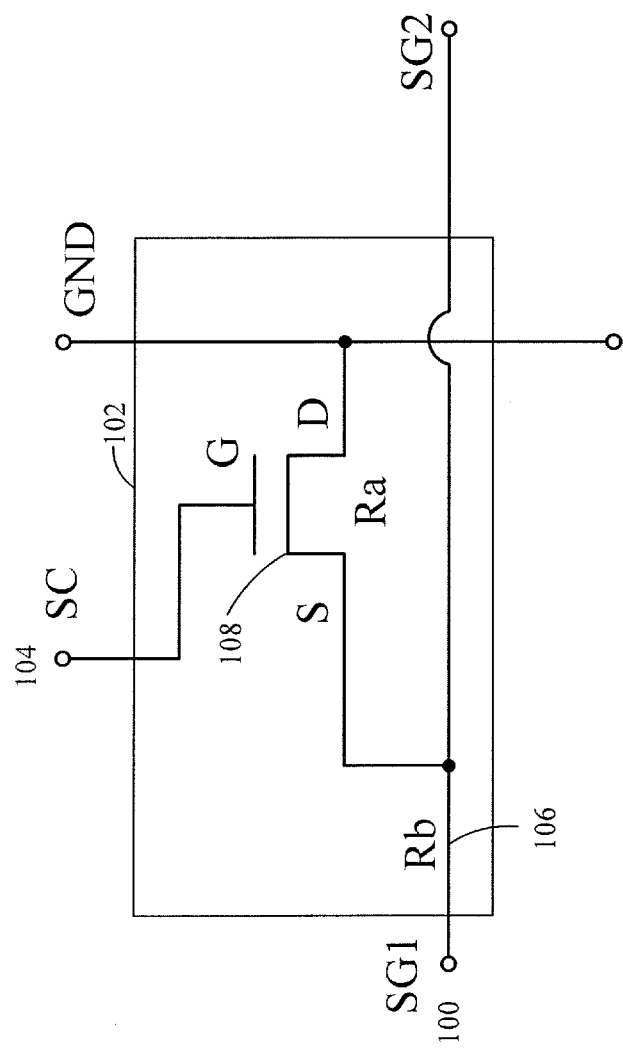
FIG. 2 is a schematic view of an equivalent circuit of a gate signal-processing module in the gate driving apparatus according to one embodiment of the present invention.
Figure 3:
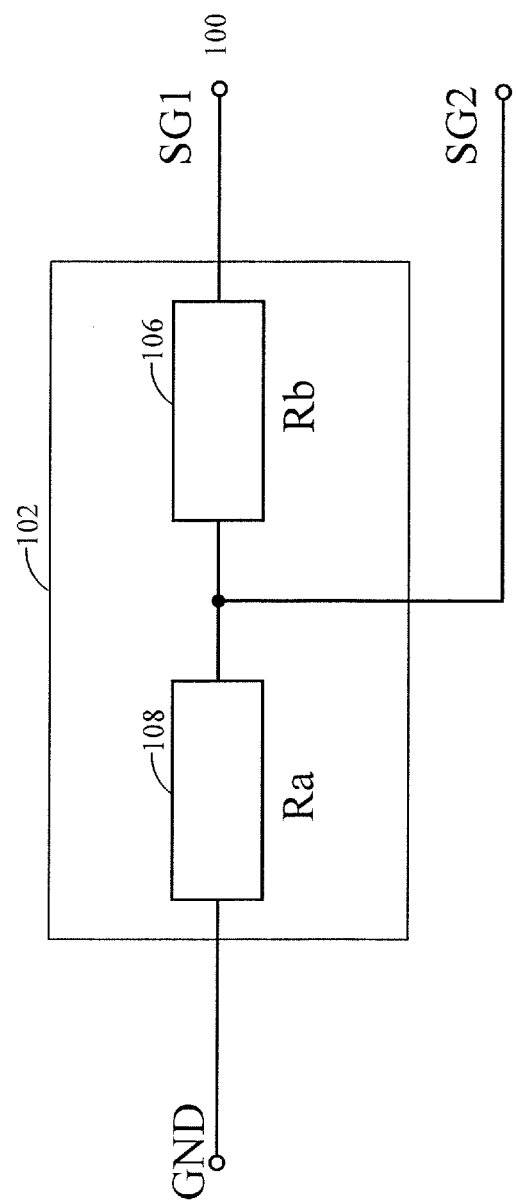
FIG. 3 is a schematic view of an equivalent resistance or impedance circuit of the gate signal-processing module according to one embodiment of the present invention.
Figure 4:
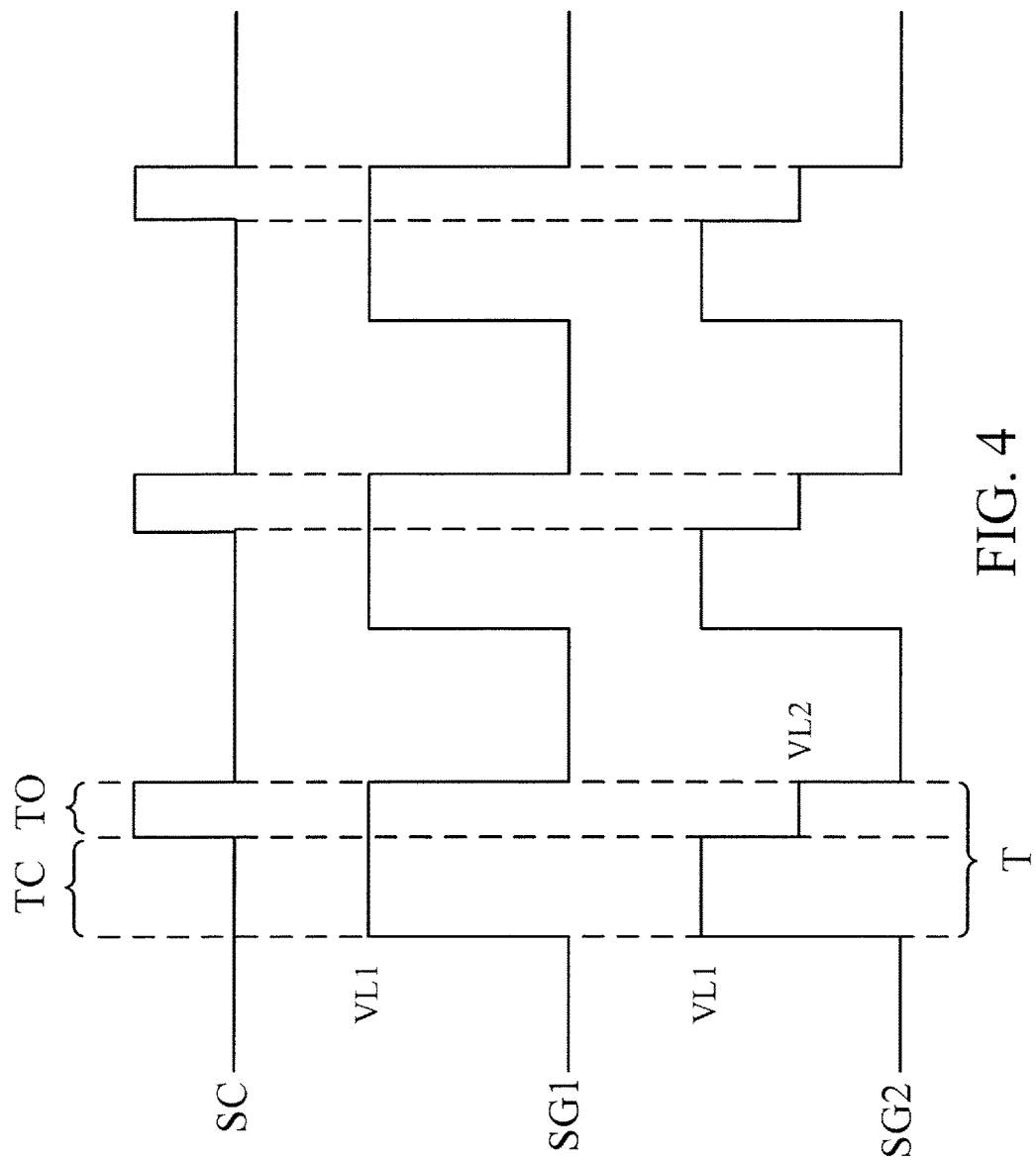
FIG. 4 is a schematic waveform timing view of the gate signal-processing module according to one embodiment of the present invention.

Please refer to FIGS. 1-4. FIG. 1 is a schematic block diagram of a gate driving apparatus according to one embodiment of the present invention. FIG. 2 is a schematic view of an equivalent circuit of a gate signal-processing module in the gate driving apparatus according to one embodiment of the present invention. FIG. 3 is a schematic view of an equivalent resistance or impedance circuit of the gate signal-processing module according to one embodiment of the present invention. FIG. 4 is a schematic waveform timing view of the gate signal-processing module according to one embodiment of the present invention. The gate driving apparatus comprises a driving circuit 100, a gate signal-processing module 102 and a control unit 104. The driving circuit 100 is electrically coupled to the gate signal-processing module 102 and the gate signal-processing module 102 is electrically coupled to the control unit 104.

The driving circuit 100 is used to output a first gate signal SG1 by way of an output terminal during a signal period T wherein the signal period T comprises an in activated interval "TC" and an activated interval "TO" which is adjacent to the inactivated interval "TC". The gate signal-processing module 102 is electrically coupled to the driving circuit 100 for receiving the first gate signal SG1 during the signal period T and for processing the first gate signal SG1 to generate a second gate signal SG2 wherein the second gate signal SG2 comprises a first amplitude level VL1 during the inactivated interval "TC".

The control unit 104 is electrically coupled to the gate signal-processing module 102 for generating a control signal SC wherein the control unit 104 utilizes the control signal SC either to activate the gate signal-processing module 102 in the activated interval "TO" or to inactivate the gate signal-processing module 102 in the inactivated interval "TC". In one case, the control signal SC is a periodical square wave signal wherein the amplitude level of the square wave is 3.3 voltages (V) or 0V, but not limited. When the control unit 104 utilizes the control signal SC to activate the gate signal-processing module 102 in the activated interval "TO", the gate signal-processing module 102 forms a first resistance value "Ra" and utilizes the first resistance value "Ra" to adjust the received first gate signal SG1 in order to form the second gate signal SG2 which comprises a second amplitude level VL2. The second amplitude level VL2 is less than the first amplitude level VL1. The gate signal-processing module 102 is a circuit structure of gate on array (GOA) which is integrated to an array substrate.

Specifically, the gate signal-processing module 102 comprises a resistor 103 and a transistor 108. The resistor 106 has a second resistance value wherein the resistor 106 receives the first gate signal SG1. The transistor 108 has a source electrode S, a gate electrode G and a drain electrode D, wherein the source electrode S is electrically coupled to the resistor 106, the gate electrode G electrically coupled to the control unit 104 receives the control signal SC, the drain electrode D is electrically coupled to a ground terminal GND, and a connection node between the resistor 106 and the source electrode S is used to output the second gate signal SG2. In one embodiment, the transistor either a N-type or a P-type metal-oxide-semiconductor field-effect transistor (MOSFET). The control unit 104 utilizes the control signal SC to control the transistor 108 to be either an activated status or an in activated status, and when the transistor 108 is in the activated status, the first resistance value "Ra" is formed between the source electrode S and the drain electrode D of the transistor 108. In the present invention, the gate signal-processing module 102 is controlled by the transistor 108 when the periodical square wave is inputted the gate electrode of the transistor 108 and drain electrode of the transistor 108 is grounded so that the falling process of the gate voltage is changed from one stage to at least two stages, e.g. two stages is described in FIG. 4.

In one case, the control signal SC is a periodical square wave signal. The second resistance value "Rb" of the resistor 106 is equal to an impedance between the output terminal of the driving circuit 100 and the source electrode S of the transistor 108. The second amplitude level VL2 of the second gate signal SG2 in the activated interval "TO" is positively related to the first resistance value "Ra". When the first resistance value "Ra" is increased, the second amplitude level VL2 raises during the activated interval "TO".

In one embodiment, when the control unit 104 activates the transistor 108 in the activated status, the second gate signal SG2 is represented by the following formula:

$$S\_out = S\_in * (R1/(R1+R2));$$

wherein S_out is the second gate signal SG2, S_in is the first gate signal SG1, R1 is the first resistance value "Ra" and R2 is the second resistance value "Rb".

An amplitude level of the first gate signal SG1 is equal to the first amplitude level VL1 of the second gate signal SG2 during the inactivated interval "TC".

The present invention employs a gate signal-processing module 102 to solve the problems: the display panel utilizes an external printed circuit board to regulate the output voltage of the gates but the output voltage cannot be adjusted by the array substrate; and the related circuits of the gate voltage output on the PCB is quite complicated.

An array substrate according to a second embodiment of the present invention comprises a gate driving apparatus disclosed in the above-mentioned descriptions.

The gate driving apparatus and an array substrate using the same in the present invention utilizes a gate signal-processing module so that the gate voltage is divided to at least two stages during the signal period, i.e. an activates interval and an inactivated interval and thus the voltage change of the amplitude level in unit time is reduced to advantageously maintain the basic standard voltage within the LCD panel to be constant.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A gate driving apparatus which is disposed on an array substrate of a liquid crystal display (LCD), the gate driving apparatus comprising:
    a driving circuit, for outputting a first gate signal by way of an output terminal during a signal period wherein the signal period comprises an activated interval and an inactivated interval which is adjacent to the activated interval;
    a gate signal-processing module electrically coupled to the driving circuit, for receiving the first gate signal during the signal period and for processing the first gate signal to generate a second gate signal wherein the second gate signal comprises a first amplitude level during the inactivated interval; and
    a control circuit electrically coupled to the gate signal-processing module, for generating a control signal wherein the control unit utilizes the control signal either to activate the gate signal-processing module in the activated interval or to inactivate the gate signal-processing module in the inactivated interval, wherein the control circuit is configured to generate a periodical square wave signal of the control signal that comprises at least one voltage amplitude level;
    wherein when the control circuit utilizes the control signal to activate the gate signal-processing module in the activated interval, the gate signal-processing module forms a first resistance value and utilizes the first resistance value to adjust the received first gate signal in order to form the second gate signal which comprises a second amplitude level;
    wherein the second amplitude level is less than the first amplitude level;
    wherein an amplitude level of the first gate signal is equal to the first amplitude level of the second gate signal during the inactivated interval;

the gate signal-processing module comprises:
    a resistor having a second resistance value wherein the resistor receives the first gate signal; and
    a transistor having a source electrode, a gate electrode and a drain electrode, wherein the source electrode is electrically coupled to the resistor, the gate electrode electrically coupled to the control unit receives the control signal, the drain electrode is electrically coupled to a ground terminal, and a connection node between the resistor and the source electrode is used to output the second gate signal;
    wherein the control unit utilizes the control signal to control the transistor to be either an activated status or an in activated status, and when the transistor is in the activated status, the first resistance value is formed between the source electrode and the drain electrode of the transistor.

2. The gate driving apparatus of claim 1, wherein the transistor a N-type metal-oxide-semiconductor field-effect transistor (MOSFET).

3. The gate driving apparatus of claim 1, wherein the second resistance value of the resistor is equal to an impedance between the output terminal of the driving circuit and the source electrode of the transistor.

4. The gate driving apparatus of claim 1, wherein the second amplitude level of the second gate signal in the activated interval is positively related to the first resistance value.

5. The gate driving apparatus of claim 4, wherein when the control unit activates the transistor in the activated status, the second gate signal is represented by the following formula:

$$S\_out = S\_in * (R1/(R1+R2));$$

wherein S_out is the second gate signal, S_in is the first gate signal, R1 is the first resistance value and R2 is the second resistance value.

6. An array substrate, comprising a gate driving apparatus wherein the gate driving apparatus comprises:
    a driving circuit, for outputting a first gate signal by way of an output terminal during a signal period wherein the signal period comprises an activated interval and an inactivated interval which is adjacent to the activated interval;
    a gate signal-processing module electrically coupled to the driving circuit, for receiving the first gate signal during the signal period and for processing the first gate signal to generate a second gate signal wherein the second gate signal comprises a first amplitude level during the inactivated interval; and
    a control circuit electrically coupled to the gate signal-processing module, for generating a control signal wherein the control unit utilizes the control signal either to activate the gate signal-processing module in the activated interval or to inactivate the gate signal-processing module in the inactivated interval, wherein the control circuit is configured to generate a periodical square wave signal that comprises at least one voltage amplitude level;
    wherein when the control circuit utilizes the control signal to activate the gate signal-processing module in the activated interval, the gate signal-processing module forms a first resistance value and utilizes the first resistance value to adjust the received first gate signal in order to form the second gate signal which comprises a second amplitude level;

wherein the second amplitude level is less than the first amplitude level;

wherein the gate signal-processing module comprises:

a resistor having a second resistance value wherein the resistor receives the first gate signal; and a transistor having a source electrode, a gate electrode and a drain electrode, wherein the source electrode is electrically coupled to the resistor, the gate electrode electrically coupled to the control unit receives the control signal, the drain electrode is electrically coupled to a ground terminal, and a connection node between the resistor and the source electrode is used to output the second gate signal;

wherein the control unit utilizes the control signal to control the transistor to be either an activated status or an in activated status, and when the transistor is in the activated status, the first resistance value is formed between the source electrode and the drain electrode of the transistor.

7. The array substrate of claim 6, wherein the transistor a N-type metal-oxide-semiconductor field-effect transistor (MOSFET).

8. The array substrate of claim 6, wherein the second resistance value of the resistor is equal to an impedance between the output terminal of the driving circuit and the source electrode of the transistor.

9. The array substrate of claim 6, wherein the second amplitude level of the second gate signal in the activated interval is positively related to the first resistance value.

10. The array substrate of claim 9, wherein when the control unit activates the transistor in the activated status, the second gate signal is represented by the following formula:

$$S\_out = S\_in * (R1/(R1+R2));$$

wherein S_out is the second gate signal, S_in is the first gate signal, R1 is the first resistance value and R2 is the second resistance value.

11. The array substrate of claim 6, wherein an amplitude level of the first gate signal is equal to the first amplitude level of the second gate signal during the inactivated interval.

* * * * *